(12) United States Patent
de Goeij et al.

(10) Patent No.: US 10,851,821 B2
(45) Date of Patent: Dec. 1, 2020

(54) PANEL SPLICE CONNECTOR FOR LINEAR PANELS

(71) Applicant: Hunter Douglas, Industries B.V., El Rotterdam (NL)

(72) Inventors: Hans Kurt de Goeij, El Rotterdam (NL); Jacob Willem Krijn van Koppen, El Rotterdam (NL)

(73) Assignee: Hunter Douglas Industries B.V., Rotterdam (NL)

(*) Notice: Subject to any disclaimer, the term of this patent is extended or adjusted under 35 U.S.C. 154(b) by 602 days.

(21) Appl. No.: 15/587,585

(22) Filed: May 5, 2017

(65) Prior Publication Data
US 2017/0321732 A1 Nov. 9, 2017

(30) Foreign Application Priority Data

May 9, 2016 (NL) .................................... 1041856

(51) Int. Cl.
*F16B 5/06* (2006.01)
*E04F 13/08* (2006.01)

(52) U.S. Cl.
CPC ............ *F16B 5/0642* (2013.01); *E04F 13/08* (2013.01)

(58) Field of Classification Search
CPC .. F16B 7/0413; Y10T 403/55; Y10T 403/557; E04B 9/10; E04B 1/5818
USPC .................................................. 403/DIG. 15
See application file for complete search history.

(56) References Cited

U.S. PATENT DOCUMENTS

| 2,150,130 | A | * | 3/1939 | Ragsdale | B61D 17/18 |
| | | | | | 52/466 |
| D158,461 | S | * | 5/1950 | Hammerly | D25/119 |
| 2,833,575 | A | * | 5/1958 | Haller | E04B 9/10 |
| | | | | | 403/313 |
| 2,934,184 | A | * | 4/1960 | Moser | F16B 5/06 |
| | | | | | 403/295 |
| D189,447 | S | * | 12/1960 | Attwood | D25/121 |
| D199,024 | S | * | 9/1964 | Huret | D25/123 |
| 3,336,711 | A | * | 8/1967 | Menke | E04F 13/0803 |
| | | | | | 52/364 |
| 3,509,675 | A | * | 5/1970 | McClain | E04F 13/12 |
| | | | | | 52/462 |
| 3,588,151 | A | * | 6/1971 | Korenz | F16B 2/241 |
| | | | | | 403/397 |

(Continued)

FOREIGN PATENT DOCUMENTS

| DE | 2109117 A1 * | 9/1972 | ............... E04B 9/10 |
| DE | 4322631 A1 * | 1/1995 | ............... E04B 9/10 |

(Continued)

OTHER PUBLICATIONS

European Search Report dated Sep. 25, 2017 (7 pages).

*Primary Examiner* — Jonathan P Masinick
(74) *Attorney, Agent, or Firm* — Dority & Manning, P.A.

(57) ABSTRACT

A panel splice connector configured to splice two adjacent linear panels at their respective longitudinal ends. The connector comprises a longitudinally extending base portion, having a length and a width, and two wall portions each extending from the base portion at opposed, longitudinally extending sides thereof. At least one of the wall portions comprises a resilient section that allows a free, longitudinally extending edge of said wall portion to be resiliently displaceable towards the base portion.

22 Claims, 8 Drawing Sheets

(56) References Cited

U.S. PATENT DOCUMENTS

| | | | | |
|---|---|---|---|---|
| 3,671,062 | A * | 6/1972 | Ashworth | F16B 7/0413 |
| | | | | 403/292 |
| 3,673,402 | A * | 6/1972 | Weiss | F21V 17/007 |
| | | | | 362/220 |
| 4,117,638 | A * | 10/1978 | Kidd, Jr. | E04C 2/54 |
| | | | | 52/200 |
| 4,222,552 | A * | 9/1980 | Matteo, Sr. | E01F 15/0453 |
| | | | | 248/345.1 |
| 4,305,677 | A * | 12/1981 | Kowalski | F16B 7/04 |
| | | | | 403/205 |
| 4,843,746 | A * | 7/1989 | DesNoyers | G09F 7/18 |
| | | | | 40/607.04 |
| 4,979,345 | A * | 12/1990 | Celsi | E04B 1/3205 |
| | | | | 52/481.1 |
| 5,297,886 | A * | 3/1994 | Jansen | F16B 7/0413 |
| | | | | 403/232.1 |
| 6,146,048 | A * | 11/2000 | Stibolt | E04F 19/06 |
| | | | | 24/462 |
| 6,434,903 | B1 * | 8/2002 | Hertweck | E04B 9/0478 |
| | | | | 411/85 |
| 6,996,946 | B1 * | 2/2006 | Cazzolaro | E04C 3/005 |
| | | | | 24/546 |
| 7,198,424 | B2 * | 4/2007 | Buttau | E04B 2/7453 |
| | | | | 403/341 |
| 7,204,064 | B2 * | 4/2007 | Cazzolaro | E04B 1/3441 |
| | | | | 24/546 |
| 7,618,210 | B2 * | 11/2009 | Wagner | E04F 11/1836 |
| | | | | 403/306 |
| 7,694,478 | B2 * | 4/2010 | Zahner | E04D 3/366 |
| | | | | 52/302.3 |
| 8,235,623 | B2 * | 8/2012 | Wagner | E04F 11/1836 |
| | | | | 403/297 |
| 9,024,188 | B2 * | 5/2015 | Lacey, Jr. | F16L 3/23 |
| | | | | 174/68.3 |
| 9,644,652 | B2 * | 5/2017 | Hertweck | E04B 9/10 |
| 9,657,481 | B2 * | 5/2017 | Florenske | E04F 13/0812 |
| 9,741,269 | B2 * | 8/2017 | Ellingson | G09F 7/18 |
| 10,072,425 | B1 * | 9/2018 | Madden | F16B 12/40 |
| 10,316,876 | B2 * | 6/2019 | Huwer | E04B 9/10 |
| 2005/0095060 | A1 * | 5/2005 | Buttau | E04B 2/7453 |
| | | | | 403/252 |
| 2006/0123734 | A1 * | 6/2006 | Cazzolaro | E04B 1/3441 |
| | | | | 52/656.1 |
| 2007/0206989 | A1 * | 9/2007 | Wagner | E04F 11/1836 |
| | | | | 403/297 |
| 2010/0104356 | A1 * | 4/2010 | Wagner | E04F 11/1836 |
| | | | | 403/297 |
| 2014/0112711 | A1 * | 4/2014 | Hertweck | E04B 9/10 |
| | | | | 403/297 |
| 2015/0337538 | A1 * | 11/2015 | Florenske | E04F 13/0812 |
| | | | | 52/481.1 |
| 2016/0348371 | A1 * | 12/2016 | Stulier | E04D 3/18 |
| 2018/0347259 | A1 * | 12/2018 | Kronenberg | F16B 7/0413 |

FOREIGN PATENT DOCUMENTS

| | | | | |
|---|---|---|---|---|
| DE | 4446227 B4 * | 1/2006 | | E04B 9/10 |
| EP | 0062756 | 10/1982 | | |
| EP | 0095021 A1 * | 11/1983 | | E04B 1/6104 |
| FR | 2624172 A1 * | 6/1989 | | E04B 9/18 |
| FR | 2848269 A1 * | 6/2004 | | E04B 1/5818 |
| FR | 2856444 A1 * | 12/2004 | | E04B 9/065 |
| FR | 2900219 A1 * | 10/2007 | | E04B 9/10 |
| FR | 2856444 B1 * | 7/2008 | | E04B 9/065 |
| FR | 3027930 A1 * | 5/2016 | | E04B 2/7459 |
| WO | WO 2008003232 | 1/2008 | | |

* cited by examiner

PANEL SPLICE CONNECTOR FOR LINEAR PANELS

CROSS REFERENCE TO RELATED APPLICATIONS

This application is based upon and claims priority to Netherlands Patent Application No. 1041856, filed on May 9, 2016 in the Netherlands Patent Office, the disclosure of which is hereby incorporated by reference herein in its entirety for all purposes.

The present invention relates to a connector for splicing the longitudinal ends of two longitudinally adjacent linear panels.

Linear panels for walls, ceilings and other structures are known in the art. Such panels have a length which is substantially greater than their width, the length generally being at least three times and more usually at least five times the width of the panel.

Linear panels may have a length of several metres, allowing the linear panels to extend from one side of a ceiling or wall to an opposite side of the ceiling or wall. However, where the linear panel has to span a distance which is greater than the length of the linear panel, two or more linear panels need to be arranged such that a longitudinal end of each linear panel is aligned with and is in close proximity to a longitudinal end of another linear panel. This permits linear panels to be used, for example, as wall or ceiling coverings for large rooms, halls, indoor public spaces and the like.

Figure 1:
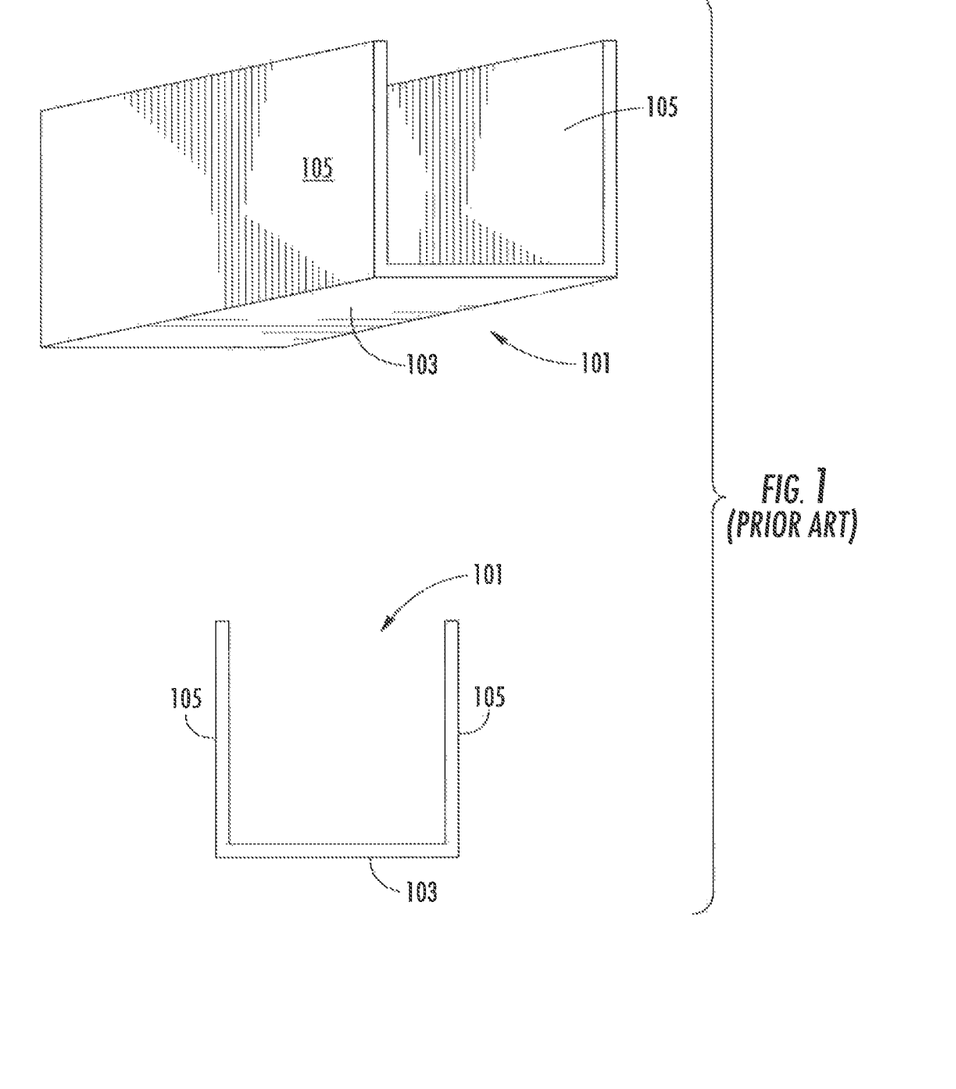
FIG. 1 shows a prior art splice in cross-sectional and in isometric view.

Linear panels are generally mounted onto a panel carrier which is fixed, either directly or indirectly, to a ceiling, wall or other structure. Panel carriers are usually provided at either longitudinal end of each panel, and may also, in the case of panels having a long length, be provided at one or more intermediate positions along the length of the panel to provide additional support.

Where the longitudinal ends of two linear panels meet, it can be difficult to align these adjacent panels. It is known to provide a splice which bridges the area where the longitudinal ends of two linear panels meet. An example of such a splice is shown in FIG. 1. Such splices generally have a longitudinal length of approximately 100-300 mm and a cross section that is similarly-shaped to that of the linear panels, for instance U-shaped, which allows the splice to be accommodated in the end portions of said panels. The splice is not usually fixed or attached to the panels, but is instead merely placed within the longitudinal end parts of adjacent linear panels such that it extends within both panels and spans the gap between them.

The linear panels may be arranged such that they have a small gap (in the order of a few millimetres, for example) between the longitudinal end of one panel and the longitudinal end of the adjacent panel to allow for expansion and contraction of the linear panels, for example due to temperature fluctuations.

Alternatively, where the material used for the linear panels does not exhibit a significant variation in length, for instance because the temperature of the installed linear panels will not be subject to significant fluctuations, the linear panels may be arranged so that their longitudinal ends abut.

Although the known splices assist in aligning adjacent linear panels arranged end-to-end, such splices exhibit several disadvantages as described later in this specification. The present invention seeks to provide an improved splice having the advantages described below.

According to the present invention there is provided a panel splice connector configured to splice two adjacent linear panels at their respective longitudinal ends. The connector comprises a longitudinally extending base portion, with a length and a width. The connector further comprises two wall portions, each extending from the base portion at opposed, longitudinally extending sides thereof. The wall portions may extend along the entire length of the connector or along a portion thereof. At least one of the wall portions comprises a resilient section that allows a free, longitudinally extending edge of the wall portion to be resiliently displaceable towards the base portion.

According to one embodiment, the or each resilient section may be formed by a first region of the wall portion being bent inwardly along its longitudinal length and a second region of said wall portion being bent outwardly along its longitudinal length.

The first region of the or each wall portion may extend from the base portion. Alternatively a third region may be provided, the third region of the respective wall portion extending from the base portion in a direction substantially perpendicular to the base portion, and the third region of the respective wall portion being located between the first region of said wall portion and the base portion.

The second region of the or each wall portion may extend from the first region. Alternatively one or more intermediate regions may be provided between the first and second regions of the or each wall portion.

Alternatively or additionally, the or each resilient section may include one or more hinges. For instance, the first and second region may be connected to each other via a hinge, e.g. a living hinge. Likewise, the first region may be connected to the third region via a hinge.

Alternatively or additionally, the or each resilient section may be made of or include a resilient material such as for instance rubber. Such resilient material may for instance be positioned along an edge of each wall portion remote from the base portion, thus forming or including said free, longitudinally extending edge of said wall portion. Such an embodiment has the additional advantage that the resilient material may be a "friction" material, that is, a material with a relatively high friction coefficient, thus helping to increase the friction between the connector and the linear panels in mounted condition.

It will be clear that such friction material as described above may advantageously be applied in other panel splice connectors, without the limitations of present claim 1. Therefore, according to an aspect of the invention, a panel splice connector may be provided, configured to splice two adjacent linear panels at their respective longitudinal ends, the connector comprising a longitudinally extending base portion, having a length and a width, and two wall portions each extending from the base portion at opposed, longitudinally extending sides thereof, wherein a friction material is provided on one or more portions of the panel splice connector that in mounted condition contact the linear panels.

Preferably, the friction material is provided on at least a part of at least one of the wall portions. The friction material may advantageously be provided on at least a part of each of the wall portions. Preferably, the friction material is provided on at least a part of the outer surface of each of the wall portions. The friction material is chosen such that the coefficient of friction between the friction material and the linear panel is greater than the coefficient of friction between the connector and the linear panel.

The friction material may comprise a sheet metal material which is provided with a roughened surface or with one or more spikes or raised portions. The sheet metal material may be formed integrally as part of the connector or may be a separate part adhered to or affixed to the connector.

Alternatively the friction material may be any other suitable friction material. Examples of suitable friction materials include rubbers, thermoplastic elastomers (TPE), cellular foams and silicones.

The friction material may be provided on or adjacent to an edge of one or both wall portions remote from the base portion. The friction material may be provided on or adjacent to the second region of one or both wall portions. The friction material may be an elongate strip extending along at least a part of the longitudinal length of the connector. The strip may extend along part or all of the longitudinal length of one or both of the wall portions. The strip may have a width sufficient to allow the strip to extend from an inner surface of the connector to an outer surface of the connector.

The friction material may be provided along the whole or part of the longitudinal length of the connector, or may be provided intermittently at intervals along the longitudinal length of the connector.

According to an aspect of the invention, the or each resilient section may be configured so as to lie entirely within the contour of the connector as defined by the base portion and the wall portions. In other words, the or each resilient section may be configured to extend inward from the wall portions, to the interior of the connector, so as not to extend beyond those outer surfaces of the connector that in mounted conditions will be in contact with the linear panels. Or in still other words, a maximum width of the connector, as seen in cross sectional view, may be determined by the width of the base portion and, optionally, the wall portions. The resilient sections do not extend beyond this maximum width. As a result, the or each resilient section will not interfere with the supporting function of the connector, where the base portion and wall portions abut against and support the longitudinal ends of the linear panels, and even may prevent "springback" thereof, as described later in this specification.

According to an aspect of the invention, the or each resilient section may be located nearer to the free, longitudinally extending edge of the wall portions than to the base portion. This too may help preventing the resilient sections from interfering with afore described supporting function of the connector. This supporting function can be accomplished by the base portion and the wall portions extending upward from the base portion, up to the resilient sections. The base portion and adjoining wall portions may have a conventional shape, ideally matching that of the linear panels that are to be spliced.

Where it is desired that a linear panel should be supported by a panel carrier at a location where a connector is present in the linear panel, then part of the wall portion of the connector may be removed such that a recess is provided in the wall portion of the connector to enable the carrier to engage the panel without interference from the connector.

The linear panels may be made of any suitable rigid material. For example, the linear panels may be made of a metal such as aluminium.

The connector may be made from any suitable material. Preferably, the connector is made from a sheet metal material, such as aluminium, for example.

The present invention will now be described by way of example only and with reference to the following drawings, of which:

FIG. 3 shows an isometric view of the panel splice connector of FIG. 2a.

FIG. 5 shows an isometric view of the panel splice connector of FIG. 4a.

In FIG. 1, a prior art splice 101 is shown in isometric and cross-sectional view. The splice 101 has a base portion 103 and two wall portions 105. The splice 101 has a simple U-shaped cross-section. There are no means provided for affixing the splice to a linear panel; in use the splice is merely placed in the desired position within the linear panels to be spliced.

Figure 2A:
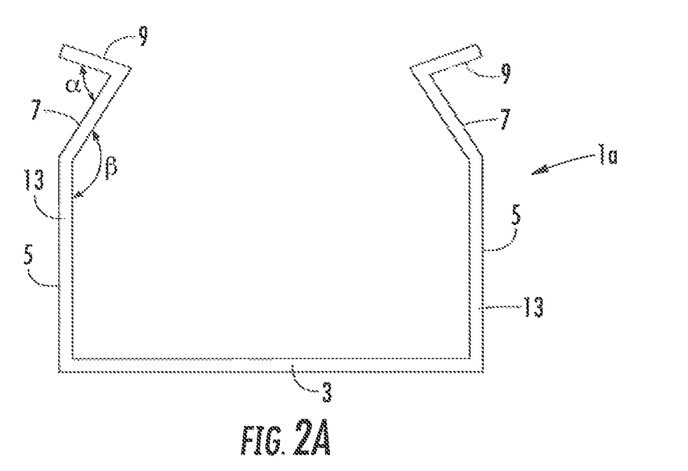
FIGS. 2a-2c show cross-sectional views of embodiments of panel splice connectors in accordance with the present invention.
Figure 2B:
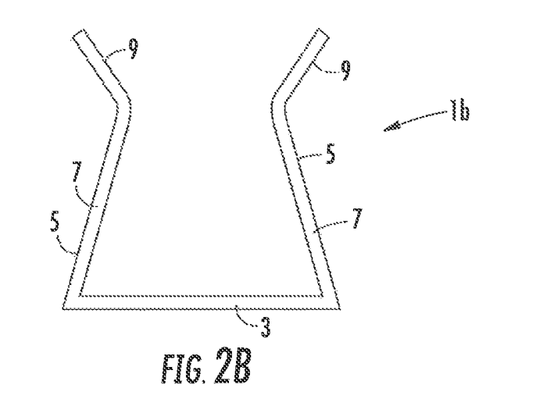
Figure 2C:
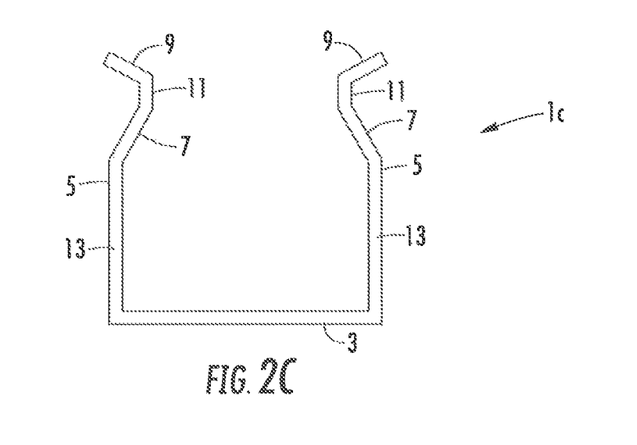

FIGS. 2a-2c show embodiments of connectors 1a-1c respectively in accordance with the present invention. All the connectors have a base portion 3 and two wall portions 5. The base portion may be formed integrally with the wall portions, or alternatively may be formed separately from the wall portions and joined thereto. The wall portions 5 all comprise a resilient section, that in the illustrated embodiments is formed by a first region 7 which is bent inwardly along the longitudinal length of the connector and a second region 9 which is bent outwardly along the longitudinal length of the connector. The first regions 7 of the wall portion 5 and the second regions 9 of the wall portion 5 may be formed from a resilient material. Alternatively, the first and second regions may itself be formed from a relatively stiff or rigid material but their interconnection may be formed from a resilient material or comprise a hinge. The first and second region 7, 9 may be adjacent each other as shown in FIGS. 2a and 2b or may be separated by an intermediate region 11, as shown in FIG. 2c. This intermediate region 11 may be hingedly connected to said first and second region 7,9 and/or may itself be formed from a resilient material. Preferably the angle α between the first region 7 and the second region 9 of a wall portion 5 is in the range of 70-90 degrees. The first and second regions (and also any intermediate region present) may be formed integrally with each other. The connector may also comprise a third region 13 of the wall portion 5 as shown in FIGS. 2a and 2c. The first and second regions (and also any intermediate region present) may be formed integrally with the third region 13 of the wall portion 5 and/or the base portion 3. The third region 13 of the wall portion 5 and the base portion 3 are not required to be formed from a resilient material.

Preferably the obtuse angle β between the third region 13 and the first region 7 of a wall portion 5 is in the range of 140-160 degrees. The connectors 1a-1c all have a generally U-shaped cross-sectional area shaped and sized to permit the connector to be positioned in a corresponding linear panel.

Figure 3:
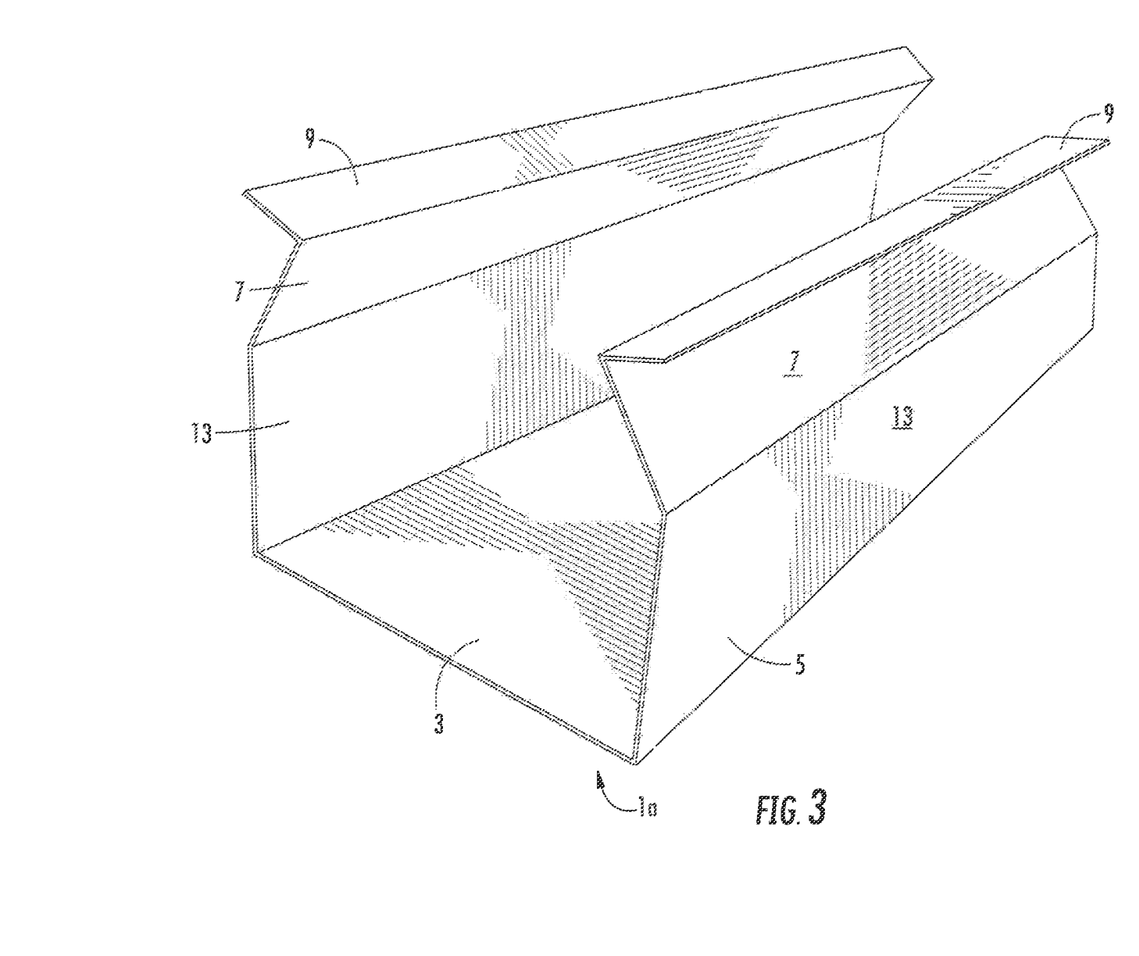

FIG. 3 shows an isometric view of the panel splice connector 1a of FIG. 2a.

Figure 4A:
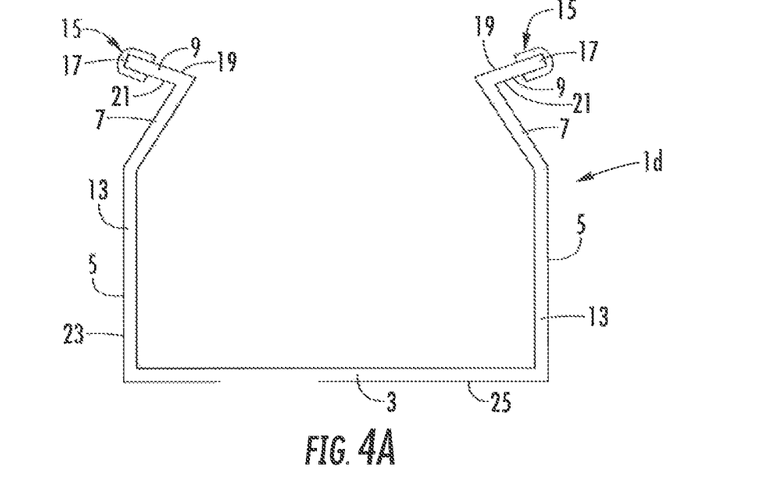
FIGS. 4a-4c show cross-sectional views of embodiments of panel splice connectors similar to those depicted in FIGS. 2a-2c but further including a friction material in accordance with the present invention.
Figure 4B:
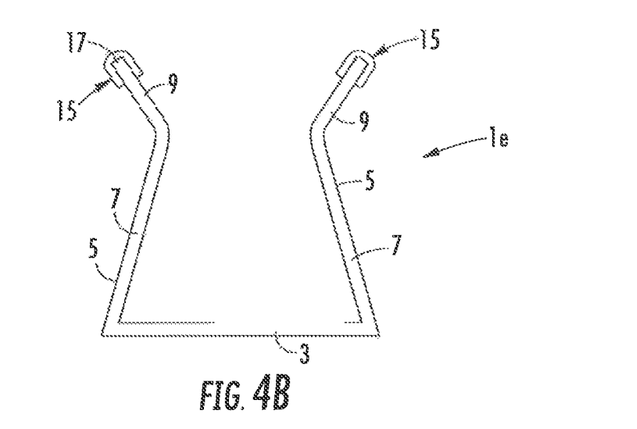
Figure 4C:
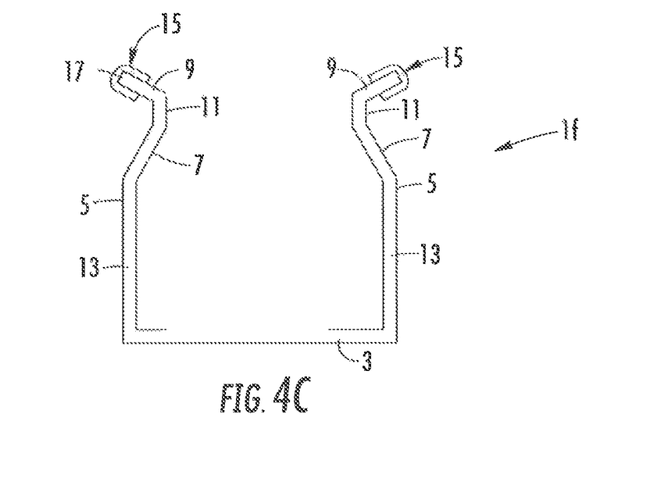

FIGS. 4a-4c show embodiments of further connectors 1d-1f respectively in accordance with the present invention. The connectors 1d-1f are similar to those shown in FIGS. 2a-2c respectively, except that the connectors 1d-1f further include a friction material 15. In this example, the friction material 15 is located at the edge 17 of the wall portion 5 remote from (i.e. opposite) the base portion 3. This edge 17 of the wall portion 5 is part of the second region 9 of the wall portion 5. According to a further embodiment of the invention (not shown), the connector may be similar in shape to the one shown if FIG. 1, with friction material similar to that shown in FIGS. 4a-4c being provided at the edges of the wall portions 105 remote from the base portion 103.

Figure 5:
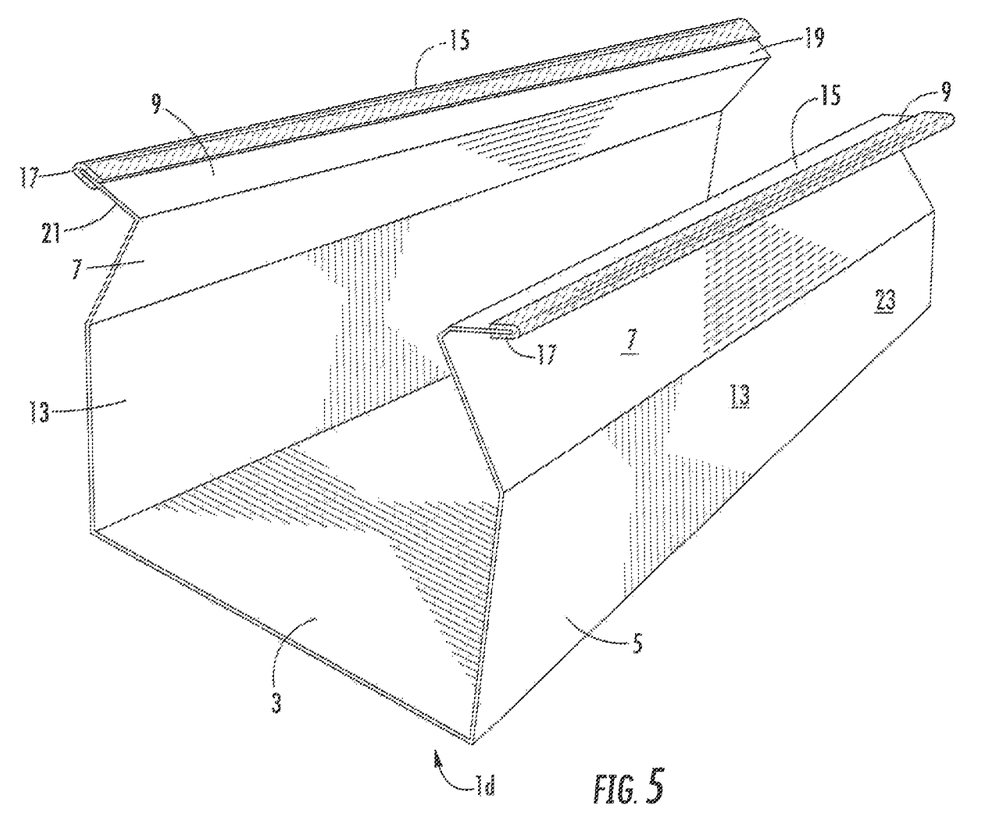

FIG. 5 shows an isometric view of the panel splice connector 1d of FIG. 4a. As can be seen in FIG. 5, the friction material 15 in this example is a strip of rubber or other suitable material which extends along the longitudinal length of the edge 17 of the wall portion 5. A strip is provided on both wall portions. The strip has a width sufficient to allow the strip to extend from the inner surface 19 of the second region 9 of the wall portion 5 of the connector 1d over the edge 17 to an outer surface 21 of the second region 9 of the wall portion 5.

The friction material may be adhered to the connector by pouring a liquid friction material onto the connector or by dipping the connector into a liquid friction material and allowing it to set. Alternatively, where the friction material is solid, the friction material may be adhered to the connector by simply pressing the friction material against the connector or by means of a suitable adhesive. Alternatively, the friction material may be fixed to the connector by any other suitable method or fastening means.

Although this example shows a strip provided along both wall portions, the friction material may be provided along just one of the wall portions, and may additionally or alternatively be provided on the outer surface 23 of the third region 13 of the wall portion 5 and/or the outer surface 25 of the base portion 3 instead of or in addition to the second region 9 of the wall portion 5.

Although this example shows a strip provided along the whole of the longitudinal length of the connector, the friction material may take a form other than a strip, for example a square, oval or circular based shape. Furthermore, the friction material may extend only over a part of the longitudinal length of the connector, and may be provided intermittently at regular or irregular intervals along part or all of the longitudinal length of the connector.

Figure 6A:
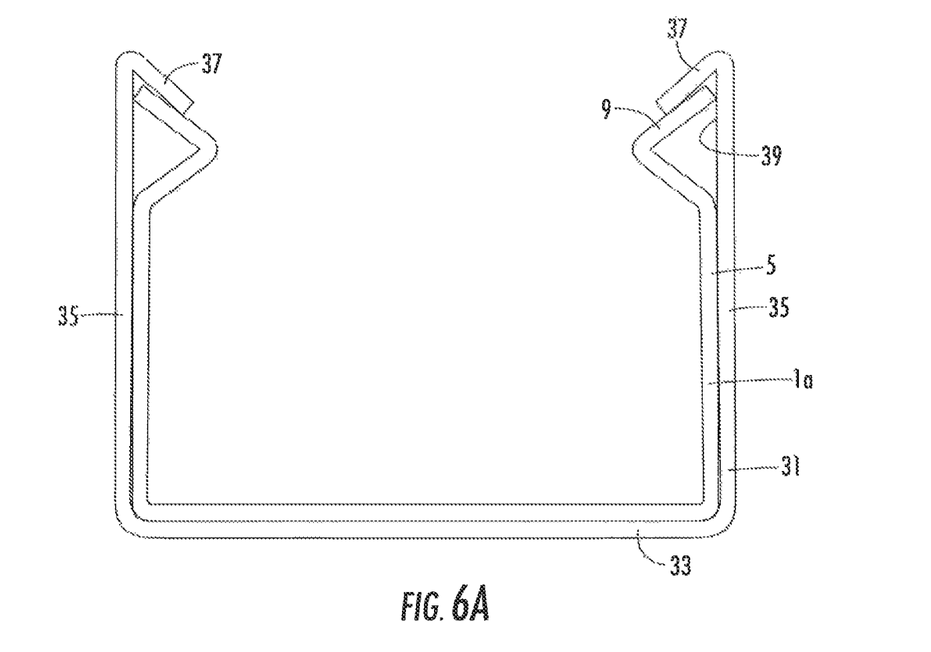
FIGS. 6a and 6b show cross-sectional views of the panel splice connectors of FIGS. 2a and 4a respectively located in a linear panel.

FIG. 6a shows a cross-sectional view of the panel splice connector 1a of FIG. 2a located in a linear panel 31. The linear panel 31 has a substantially U-shaped cross section, and comprises a panel base portion 33 and two panel side walls 35 extending opposite to each other and away from the panel base portion 33. The linear panel 31 also includes flanges 37 located at the edges of the panel side walls 35 remote from the panel base portion 33, the flanges 37 permitting the linear panel 31 to be attached to a panel carrier (not shown). The flanges 37 in this example are angled towards the interior of the linear panel 31, however the flanges may instead be substantially parallel to the panel base portion 33 and/or substantially perpendicular to the panel side walls 35, or angled away from the interior of the linear panel.

The connector 1a has a U-shaped cross section similar to that of the linear panel 31, and is sized to fit readily yet snugly into the linear panel 31. When fitted in the linear panel 31, the second region 9 of each wall portion 5 makes firm contact with the inside surface 39 of the linear panel 31 and serves to grip the inside surface 39, thereby holding the linear panel 31 and the connector 1a tightly together. This prevents the connector from moving relative to the panel, and, when the connector is installed in two adjacent linear panels to splice the longitudinal ends of the two linear panels together, relative movement between the two linear panels is prevented.

Figure 6B:
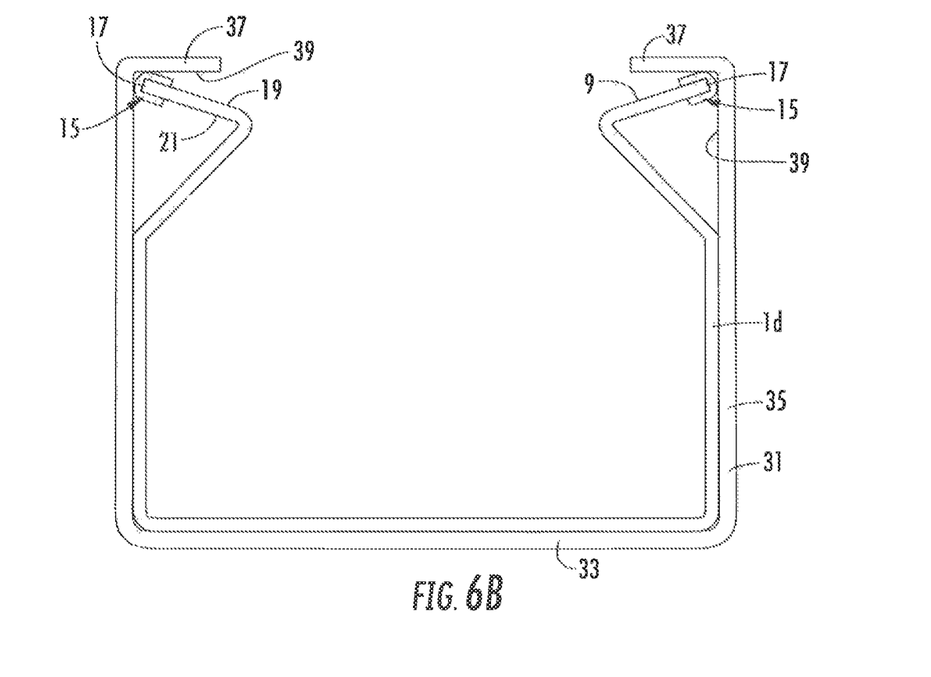

FIG. 6b shows a cross-sectional view of the panel splice connector 1d of FIG. 4a located in a linear panel 31. The flanges 37 of the linear panel 31 in this example are formed such that they extend in a direction substantially parallel to the panel base portion 33 and substantially perpendicular to the panel side walls 35. However, the flanges 37 might instead be angled towards or away from the interior of the linear panel.

The connector 1d has a U-shaped cross section similar to that of the linear panel 31, and is sized to fit readily yet snugly into the linear panel 31. When fitted in the linear panel 31, the friction material 15 located at the edge 17 of the second region 9 of each wall portion 5 makes firm contact with the inside surface 39 of the linear panel 31 and serves to grip the inside surface 39, thereby holding the linear panel 31 and the connector 1d tightly together. This prevents the connector from moving relative to the panel, and, when the connector is installed in two adjacent linear panels to splice the longitudinal ends of the two linear panels together, relative movement between the two linear panels is prevented. Due to the coefficient of friction between the friction material 15 and the inside surface 39 of the linear panel 31 being greater than the coefficient of friction between the second region 9 of the wall portion 5 of the connector 1d and the inside surface 39 of the linear panel 31, the connector 1d is better able to maintain its position in the linear panel 31 than the connector 1a when forces are applied, e.g. during expansion or contraction of a panel due to temperature fluctuations.

The friction material 15 may have a thickness in the range of 0.1 to 5 mm to provide a good friction fit between the friction material 15 and the inside surface 39 of the linear panel 31.

Figure 7A:
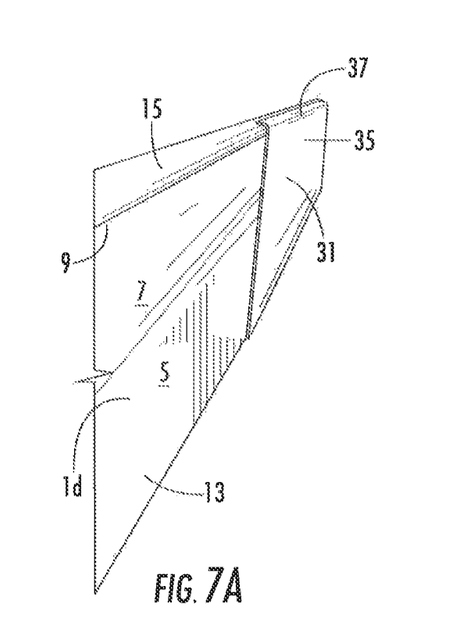
FIG. 7a shows an isometric view of the panel splice connector of FIG. 4a in the process of being positioned in a linear panel.

FIG. 7a shows the panel splice connector 1d of FIG. 4a in the process of being placed in a linear panel 31. The connector 1d is arranged so that approximately half of its longitudinal length is placed in the linear panel 31, the other half being for placement in a second linear panel (not shown) which is to be positioned so that its longitudinal end abuts the longitudinal end of the linear panel 31. The friction material 15 of the connector 1d can be seen in FIG. 7a to be near to and protruding above the flange 37 of the linear panel 31. The panel side walls 35 of the linear panel 31 can be seen to be angled outwardly at their longitudinal end, such that they are not perpendicular to the panel base portion 33. When manufacturing linear panels, this outward deformation of the panel side walls at their longitudinal ends is a problem which can occur due to cutting the panel to a required length, and is referred to as "springback".

In order to position the connector 1d in the linear panel 31, the edges 17 of the wall portions 5 are pushed in a direction roughly parallel to the wall portions 5 and towards the base portion 3 (i.e. in a downward direction in FIGS. 7a and 7c) and towards each other (i.e. inwardly). This causes the wall portions 5 of the connector 1d to become compressed as shown in FIG. 7c due to the resilient material from which at least the first region 7 and the second region 9 of the wall portions 5 are formed. The solid line in FIG. 7c shows a wall portion 5 in an uncompressed state, whilst the dotted line in FIG. 7c shows the wall portion 5 in a compressed state. This state of compression facilities the positioning of the connector 1d in the linear panel 31 in the manner shown in FIG. 6b.

Figure 7B:
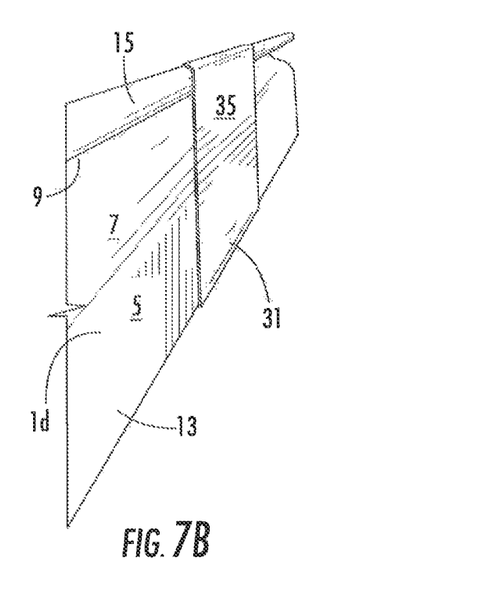
FIG. 7b shows an isometric view of the panel splice connector of FIG. 4a once it is positioned in a linear panel.
Figure 7C:
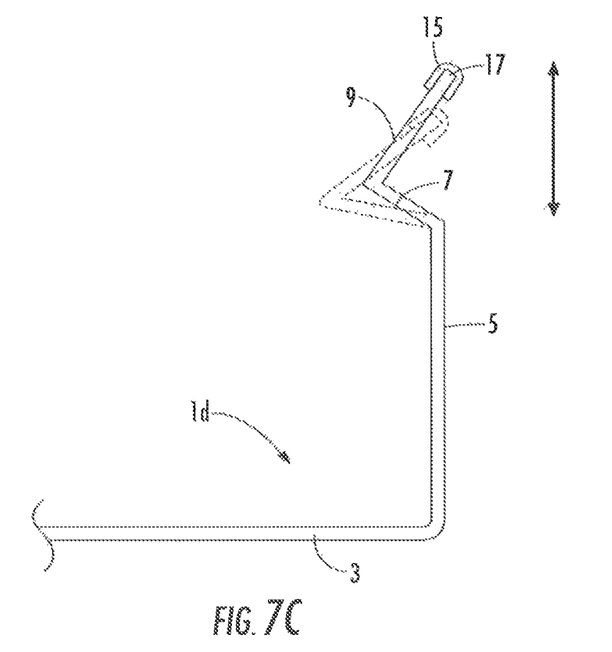
FIG. 7c shows two overlapping partial cross-sectional views of the panel splice connector of FIG. 4a when it is (a) in an uncompressed state and (b) being compressed in order to be positioned in a linear panel.

FIG. 7b shows the connector of FIGS. 4b and 7a once it has been positioned in the linear panel 31. After the connector 1d has been compressed and positioned in the linear panel 31 as shown in FIG. 6b, the compression force is removed and the resilient material acts to restore the wall portion 5 to its original form as shown in FIG. 7c. In doing so, the connector 1d exerts a force on the panel in a direction perpendicular to and away from the panel base portion 33 (i.e. an upward direction in FIGS. 7a-7c). This causes the outwardly angled longitudinal ends of the panel side walls 35 to be "pulled" inwards, such that they extend from the panel base portion 33 in a direction substantially perpendicular to the panel base portion 33 as shown in FIG. 7b, and fit flush around the connector. The resilient material is ideally chosen such that the force exerted by the connector on the panel is not sufficient to stretch the panel side walls 35 but is large enough to compensate for the deformation or "springback" of the longitudinal ends of the linear panel as described above.

Where the connector includes a third region 13 of the wall portion 5 being substantially perpendicular to the panel base portion 33, as shown in FIGS. 2a, 2c, 4a and 4c, the force exerted on the panel by the connector advantageously causes the panel side walls 35 to straighten such that they become substantially perpendicular to the panel base portion 33 by conforming to the shape of the third region 13 of the connector. The first and second regions of the connector are preferably relatively small compared to the third region, but should be sufficiently large enough to permit the connector to function in the manner described above.

Although the connector shown in FIGS. 7a-7c includes a friction material, this is an optional feature. However, as explained above, use of a suitable friction material may be desirable in order to allow the connector to be even more firmly positioned in the linear panels and to even better resist movement of adjacent linear panels, especially in situations where the linear panels may be subject to external forces or may be likely to be subject to forces (in longitudinal and/or lateral direction) resulting for example from one or more panels undergoing thermal expansion, contraction and/or afore described springback.

Figure 8:
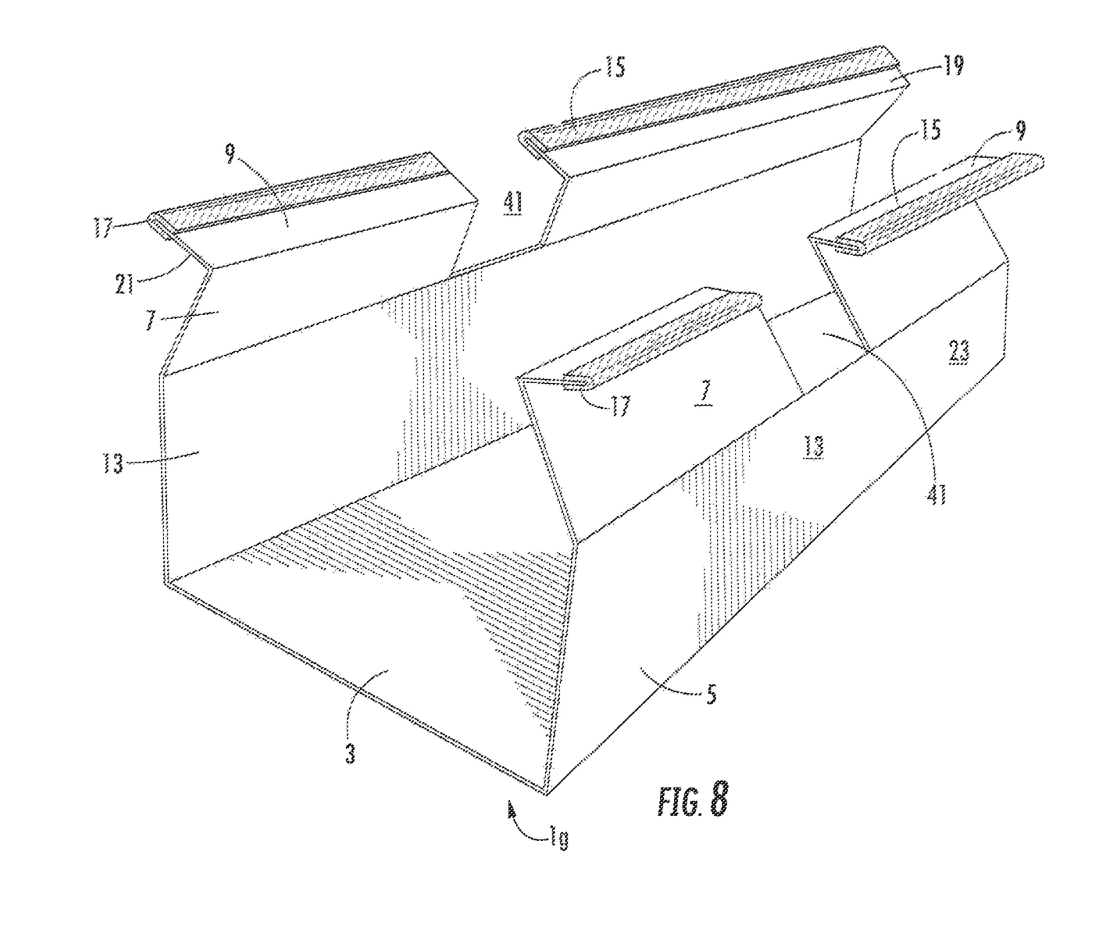
FIG. 8 shows an isometric view of a panel splice connector in accordance with the present invention having a recess in each of the wall portions of the connector.

FIG. 8 shows a connector 1g similar to connector 1d depicted in FIG. 5, except that the connector 1g has a recess 41 formed in each of the wall portions 5 of the connector 1g. The recess 41 is configured to accommodate an associated panel carrier (not shown) and may be formed at any desired point along the longitudinal length of the connector. This permits a carrier to be positioned, if desired, at the location of the connector. In this example, the recess 41 is shown extending through the first 7 and second 9 regions of the wall portion 5, however, the recess may extend deeper or shallower into the wall portion 5, depending upon the configuration of the associated connector.

The recess 41 may also be applied to any of the other connectors described in or implicit from this disclosure, and is not limited to the connector depicted in FIG. 8.

Although these examples depict and describe a linear panel having a U-shaped cross-section and a connector having a corresponding U-shaped cross-section, other cross-sectional shapes are possible. For example, where a linear panel has a V-shaped cross-section, a connector having a corresponding V-shaped cross-section could be provided.

The splice connector according to the present invention has several advantages over the prior art splice previously described.

One advantage is that the connector is able to partially or wholly correct deformations in the panel side walls resulting from manufacture (such as "springback"), as described above.

A further advantage is that, as the connector is configured to exhibit a tight friction fit with the linear panel, where panels are subjected to external forces or to rising or falling temperatures, for example, any movement caused by the external forces or by the expansion or contraction of panels due to thermal fluctuations does not readily result in relative movement between the linear panel and the connector. This permits the connector to maintain two adjacent panels in alignment when their longitudinal ends are spliced by the connector. Furthermore, the panels are prevented from moving apart from each other, which would result in the splice becoming visible through the gap in the panels and could also reduce the structural integrity of the panel arrangement.

Additionally, the connector of the present invention acts to provide support and structural integrity to the shape of the linear panels, and also acts to mechanically connect and thereby strengthen the panel arrangement.

By contrast, the prior art splice merely fits loosely between the panels and is able to move relative to the panels. It offers little support or strengthening of the panel arrangement. Furthermore, a panel carrier has to be provided to support each panel near its longitudinal end, proximate to the prior art splice, as this splice provides no structural support. This requires two carriers to be placed in relatively close proximity to each other, and gives very little freedom in terms of where the carriers might be placed.

The connector of the present invention provides a strong mechanical connection between the linear panels, eliminating the need to provide carriers to support the panels at each side of each splice. This results in fewer carriers being required, with a subsequent reduction in cost, and in manufacturing time and installation time. Furthermore, the structural integrity of the connected panels is greatly enhanced, permitting the carriers to be located at positions other than proximate to a splice. This permits greater freedom in selecting the location of the carriers. Additionally, the present invention has the advantage that, if a recess or cut-out portion is provided in each wall portion of the connector as described above with reference to FIG. 8, it is possible to place a carrier at the location of the splice.

The invention claimed is:

1. A panel splice connector configured to splice two adjacent linear panels at their respective longitudinal ends, the connector comprising:
    a base portion defining a length in a longitudinal direction of the connector and further defining a width between opposed, longitudinally extending sides of the base portion in a widthwise direction of the connector extending perpendicular to the longitudinal direction, the width of the base portion defining a maximum width of the connector in the widthwise direction; and
    two wall portions each extending from the base portion at the opposed, longitudinally extending sides thereof;
    wherein:

one or each wall portion comprises a resilient section that allows a free, longitudinally extending edge of said wall portion to be resiliently displaceable towards the base portion;

the resilient section is formed by a first region of one or each wall portion being bent inwardly along its longitudinal length, towards the base portion at a first pre-defined bend formed in the or each wall portion, and a second region of one or each wall portion being bent outwardly along its longitudinal length, away from the base portion at a second pre-defined bend formed in the or each wall portion;

one or each wall portion further comprises a third region extending between the base portion and the first region of said wall portion, the third region of the or each wall portion extending from the base portion at a third pre-defined bend formed between the base portion and said wall portion.

2. A panel splice connector according to claim 1, wherein the third region of one or each wall portion extends from the third pre-defined bend in a direction perpendicular to the base portion.

3. A panel splice connector according to claim 1, wherein the second region of one or each wall portion extends directly from the first region at the second pre-defined bend.

4. A panel splice connector according to claim 1, wherein the first region extends from the first pre-defined bend at a first angle relative to the base portion, with the first angle being smaller than 90 degrees and corresponding to an interior angle of the connector.

5. A panel splice connector according to claim 1, wherein the second region extends from the second pre-defined bend at a second angle relative to the base portion, with the second angle being 90 degrees or larger and corresponding to an interior angle of the connector.

6. A panel splice connector according to claim 1, wherein the or each resilient section includes one or more hinges.

7. A panel splice connector according to claim 1, wherein the or each resilient section is made of or includes a resilient material.

8. A panel splice connector according to claim 7, wherein the resilient material is positioned at an edge of the or each wall portion remote from the base portion.

9. A panel splice connector according to claim 7, wherein the resilient material is a friction material, having a friction coefficient that is larger than that of the remainder of the panel splice connector.

10. A panel splice connector according to claim 9, wherein the friction material is provided on a part of the connector that in a mounted condition contacts the linear panels.

11. A panel splice connector according to claim 9, wherein the friction material is provided on at least a part of the wall portions.

12. A panel splice connector according to claim 9, wherein the friction material is provided on or adjacent to the second region of the or each wall portion.

13. A panel splice connector according to claim 9, wherein the friction material is an elongate strip extending along at least a part of the longitudinal length of the connector.

14. A panel splice connector according to claim 9, wherein the friction material extends from an inner surface of the connector to an outer surface of the connector.

15. A panel splice connector according to claim 9, wherein the friction material is provided intermittently at intervals along the longitudinal length of the connector.

16. A panel splice connector according to claim 1, wherein the resilient section is located nearer to the free, longitudinally extending edge of the or each wall portion than to the base portion.

17. A panel splice connector according to claim 1, wherein the wall portions extend along the entire length of the base portion.

18. A panel splice connector according to claim 1, wherein a recess is provided in the or each wall portion of the connector, the recess being configured to enable a carrier to engage a panel in which the connector is positioned without interference from the connector.

19. A combination of first and second linear panels and a panel splice connector according to claim 1.

20. A combination according to claim 19, wherein the first and second linear panels each comprise two flanges, angled towards an interior of the linear panel, and wherein the free, longitudinally extending edges of the wall portions engage said flanges in a mounted condition.

21. A combination according to claim 20, wherein an engagement force exerted by the free, longitudinally extending edges on the flanges is directed towards the interior of the first and second linear panels.

22. A combination according to claim 19, wherein the panel splice connector is designed to have its the base portion and the third region of one or each wall portion abut the first and second linear panels in a mounted condition.

* * * * *